Dec. 18, 1934. C. R. WAGNER 1,984,903
PROCESS FOR REMOVING SALT COMPOUNDS FROM CRUDE OIL
Filed Jan. 16, 1933
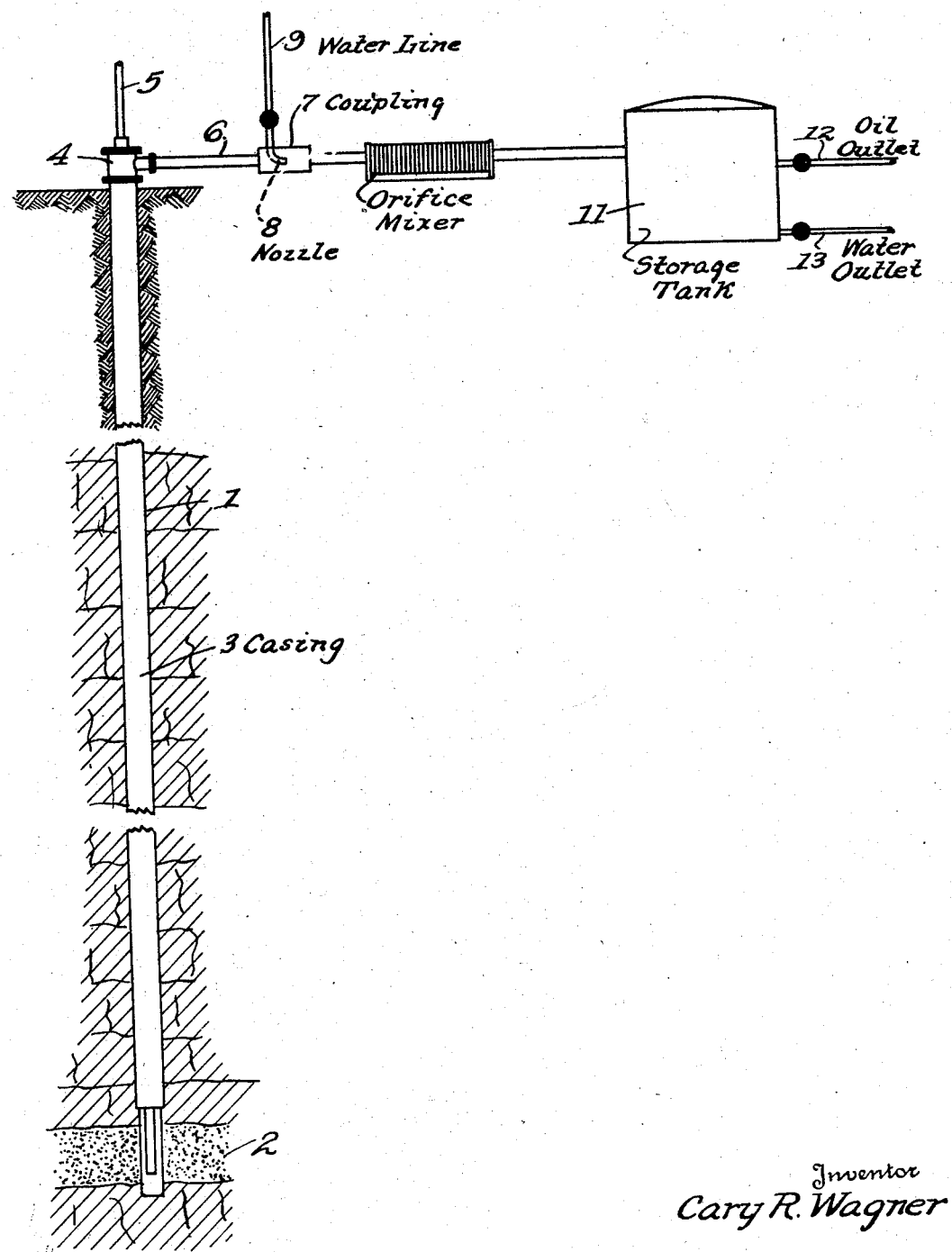
Inventor
Cary R. Wagner
By W. S. McDowell
Attorney Patented Dec. 18, 1934

1,984,903

UNITED STATES PATENT OFFICE 1,984,903

PROCESS FOR REMOVING SALT COMPOUNDS FROM CRUDE OIL

Cary R. Wagner, Chicago, Ill., assignor to The Pure Oil Company, Chicago, Ill., a corporation of Ohio Application January 16, 1933, Serial No. 651,950

2 Claims. (Cl. 196—146)

This invention relates to an improved method for removing impurities in the form of salt compounds, chlorides and other foreign inorganic compounds from crude mineral oils, in order that the latter may be handled in storage or distilling apparatus without exercising a detrimental effect upon such apparatus. In certain of its more specific aspects, the invention is directed to a process of water-washing inorganic compounds such as calcium and/or magnesium chloride from crude oils whereby to effect a thorough separation of the foreign compounds from the crude oils prior to the passage of the latter into and through distillation apparatus.

In order to increase the rate of fluid production from certain types of telluric oil-producing wells, especially wells having their fluid-bearing regions disposed in or adjacent to calcareous, limestone or other porous formations, it is now an accepted practice to introduce into the bores of such wells a treating reagent, usually in the form of hydrochloric acid in aqueous solution, in order that the reagent may attack the oil-bearing regions to partially dissolve and disintegrate the same, whereby to increase the pore area of the formation communicating with the well bore and to thus provide for augmented flow from the oil-bearing region into the well bore. Such a process has been described in the patent of R. H. Carr, No. 1,891,667 dated Dec. 20, 1932.

In thus treating oil-bearing formations with hydrochloric acid, the latter reacts with the formation to produce calcium and magnesium chlorides which are dissolved or suspended in the oil or other fluids pumped from the wells. The decomposition products of this operation which are suspended or dissolved in the removed oil, cause a great deal of trouble when such oil is delivered to refinery apparatus. In the first place, the salts specified, upon the evaporation of oil or water in which they are contained, leave a deposit in the tubes or pipes through which the fluid is passed so that normal rates of fluid flow, heat transfer and the like are seriously impaired. When magnesium chloride is present in the crude, any heating of the latter causes decomposition of the magnesium chloride with resultant liberation of hydrochloric acid gas. This decomposition begins at a temperature as low as 225° F., and becomes very rapid at temperatures around 350° F. These hydrochloric acid vapors pass over with the heated vapors from the crude oil, when such oil is subjected to heat application, and dissolve in the water which condenses in condensing apparatus. In this manner, there is obtained a very dilute solution of hydrochloric acid in water and since it is very highly ionized, it is extremely active chemically. Metallic apparatus contacting therewith is very rapidly attacked by this dilute solution, causing plant failures with attendant loss of time and expense in repairing the same.

Therefore, in order to overcome or to minimize this condition, the present invention provides a process which consists in injecting into the pipe line leaving the flow tank at the well a small amount of water not substantially in excess of 5% of the oil volume handled. This water is allowed to mix thoroughly with the oil as the two fluids flow together through the pipe line storage. In the storage tank, or in some suitable intermediate tank, the water will settle out, carrying with it the salt compounds distributed in the oil by the chemical treatment of the oil-bearing formation. The thus treated and purified oils, free from injurious salt compounds, may then be subjected to the usual refinery operations without disturbing the sustained operations which they function to impart.

In the accompanying drawing:

The figure is a diagrammatic view illustrating apparatus in which the sequence of operations provided by the present invention may be carried out.

Referring more particularly to the drawing, the numeral 1 designates a well bore extending from the ground surface to the oil-bearing formation 2. This oil-bearing formation may be disposed in limestone, sand or other porous strata, and the well bore is provided with the usual casing 3 provided at its top with a valved casing head 4. To increase the rate of fluid production from a calcareous oil-bearing formation, as indicated at 2, hydrochloric or muriatic acid may be introduced through the casing or the tubing 5 and forced through the oil-bearing formation contacting with the bottom of the well bore 1. Other formations may require different treating agents, chosen to suit the character of the particular formation. The reagent has the effect of attacking and dissolving the formation, thereby enlarging the cavity at the bottom of the well bore and the channels and pores in the formation through which the oil flows to the well bore. In this operation, the reagent used is preferably a mineral acid, such as hydrochloric or hydrofluoric acid, inasmuch as the latter upon reacting with the calcareous and siliceous matter in the oil-bearing formation forms water-soluble salts which remain in solution and are removed from the well with the spent acid and the oil. In these removed fluids, there are to be found calcium chloride and magnesium chloride, together with other compounds produced by the treatment of the oil-bearing formation for the purpose of enlarging the pores to admit of augmented flow to the well.

These chlorides have caused considerable difficulty when oils obtained from wells so treated are passed through refinery apparatus, for reasons above stated, and it is therefore the purpose of the present invention to effect their removal before the oils are subjected to heat treatment in refinery operations.

To accomplish this separation, the pipe line 6, which leads from the casing head 4, is provided with a coupling 7 in which is positioned an injector nozzle 8 connected with a valved water line 9. Water is introduced into the fluid stream passing through the line 6 in quantities substantially not in excess of 5% by volume, and to provide for the continuity of the operation and thorough admixture of the water with the fluids, the latter are passed through an orifice mixer 10. From the mixer 10, the pipe line 6 is continued to a settling tank 11. In this settling or storage tank, the water will settle out, carrying with it the compounds distributed in the oil by the chemical treatment of the oil-bearing formation 2. The clarified oil may be removed from the tank by way of the pipe line 12 and passed to suitable distillation, transportation or refining apparatus, in which it may be handled in the customary manner without injury to metallic surfaces with which it may come in contact, while the water and dissolved salt compounds may be removed by way of a pipe line 13 provided in the bottom of the tank 11.

Thus by the employment of the present invention, an outstanding objection to the acid-treating of oil producing wells is overcome, namely, by removing foreign compounds extraneously introduced into such oils during acid treatment of oil-bearing formations and which compounds, if permitted to remain, exert a detrimental action on metallic apparatus particularly when subjected to moderate heat treatment. The water added by way of the pipe line 9 to the crude oil is preferably passed through the mixer 10 of the orifice type, although other types of mixers may be used for this operation, but the degree of mixing, in any event, is regulated to avoid causing a permanent emulsion of water and oil. After standing in the storage tank 11 for a sufficient period of time, the water settles out almost completely, and the crude oil is left with but a very small fraction of its original salt content. Crude oil so treated may then be forced through the pipe lines, stills, fractionating apparatus, and other metallic oil-handling equipment of a refinery without undue injury to such equipment or impairment in its operation since the detrimental salt compounds, extraneously introduced by the acid treating of the wells, are substantially eliminated.

It will be understood that variations may be made in the process above specifically set forth without departing from the scope of the invention. Thus it is possible to employ any suitable inorganic treating agent in attacking porous oil-bearing formations, and then separating the products produced by gravity, centrifuging, filtration or electrical means. Therefore, I reserve the right to employ all such modifications in my invention that may be said to fall fairly within the scope of the following claims.

What is claimed is:

1. The method of desalting crude petroleum oil produced from wells which have been acid treated to increase the flow thereof which consists in withdrawing such oil from the well through a transfer line to a settling tank, introducing sufficient water up to 5% into the oil in the transfer line, passing the oil and water through a mixer wherein the oil and water are contacted sufficiently to permit the water to dissolve the salts in the oil but insufficiently to form a permanent emulsion, allowing the mixture to stratify and decanting the oil from the aqueous layer.

2. The method of desalting crude petroleum oil containing magnesium and calcium chlorides and produced from wells which have been treated with hydrochloric acid to increase the flow thereof which consists in withdrawing such oil from the well through a transfer line to a settling tank, introducing sufficient water up to 5% into the oil in the transfer line, passing the oil and water through a mixer wherein the oil and water are contacted sufficiently to permit the water to dissolve the salts in the oil but insufficiently to form a permanent emulsion, allowing the mixture to stratify and decanting the oil from the aqueous layer.

CARY R. WAGNER.